J. F. WILLIAMS.
HORSE DETACHING DEVICE.
APPLICATION FILED JULY 2, 1908.
909,044.
Patented Jan. 5, 1909.
2 SHEETS—SHEET 1.
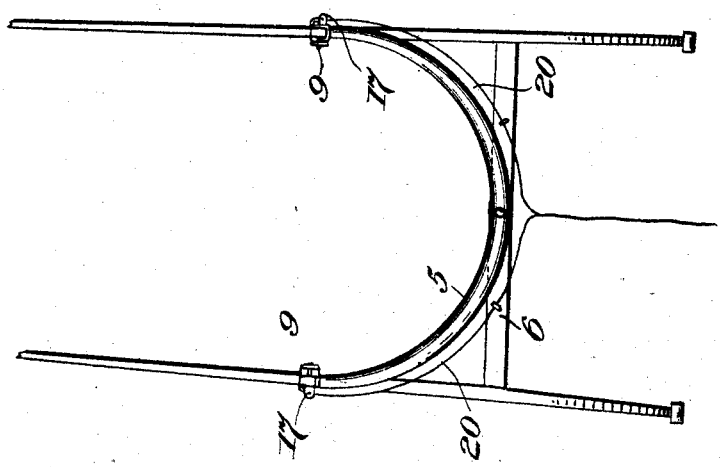
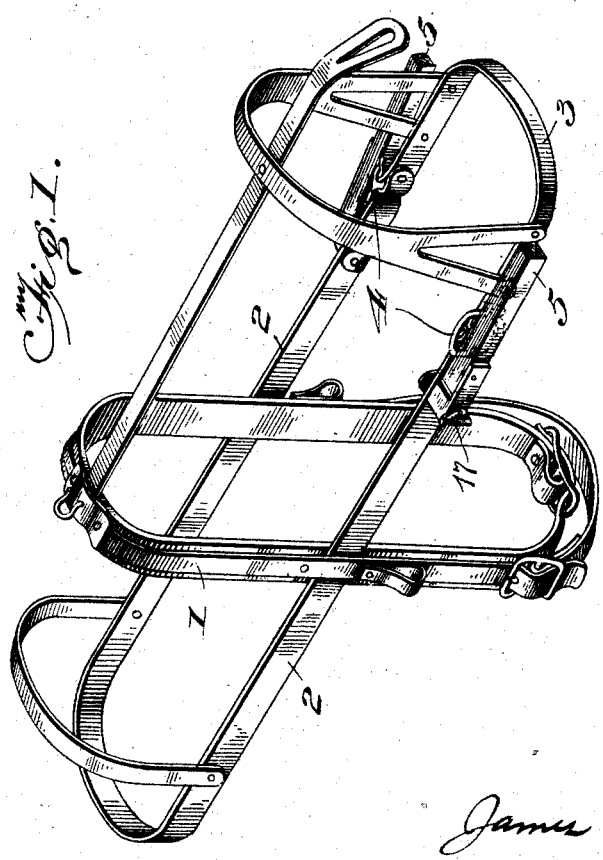
Witnesses
J. L. Ourand
W. Parker Reinohl
Inventor
James F. Williams,
By D. P. Reinohl
Attorney

J. F. WILLIAMS.
HORSE DETACHING DEVICE.
APPLICATION FILED JULY 2, 1908.

909,044.

Patented Jan. 5, 1909.

2 SHEETS—SHEET 2.

Witnesses
J. L. Ourand
W. Parker Reinohl

Inventor
James F. Williams

By D. P. Reinohl
Attorney

UNITED STATES PATENT OFFICE.

JAMES F. WILLIAMS, OF BEVIER, MISSOURI.

HORSE-DETACHING DEVICE.

No. 909,044.   Specification of Letters Patent.   Patented Jan. 5, 1909.

Application filed July 2, 1908. Serial No. 441,574.

*To all whom it may concern:*

Be it known that I, JAMES F. WILLIAMS, a citizen of the United States, residing at Bevier, in the county of Macon and State of Missouri, have invented certain new and useful Improvements in Horse-Detaching Devices; and I do hereby declare the following to be a full, clear, and exact description of the invention, such as will enable others skilled in the art to which it appertains to make and use the same.

This invention relates to devices for detaching horses from vehicles by the occupants thereof in case of a runaway or other accident, or whenever it is desired to release the horse from the vehicle, the object of the invention is to provide a simple, durable and effective device for the purpose; and the invention consists in certain improvements in construction, which will be fully disclosed in the following specification and claims.

Figure 3:
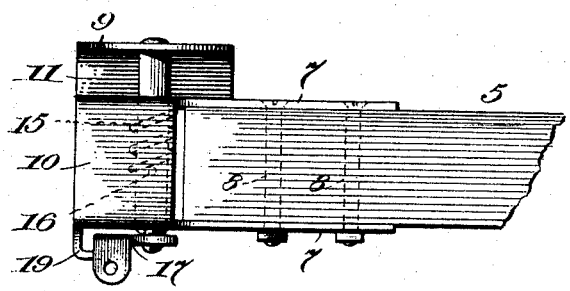
Figure 4:
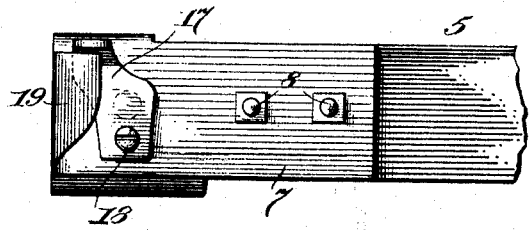
Figure 5:
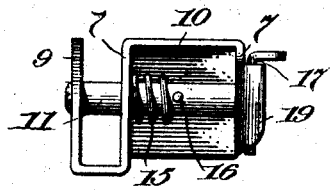
Figure 6:
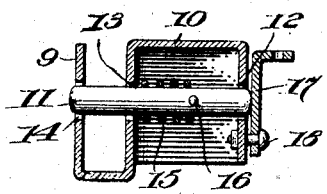

In the accompanying drawings which form part of this specification:—Figure 1 is a perspective view of a set of harness and a part of a whiffle-tree to which the tugs or traces are connected. Fig. 2 a top plan view of a pair of shafts, the whiffle-tree provided with detaching clips and means for releasing a horse. Fig. 3 a top plan view of one end of the whiffle-tree with the clip attached, and on an enlarged scale. Fig. 4 a side elevation of the same. Fig. 5 an end view of the clip, and Fig. 6 a transverse section of the clip, partly in elevation.

Reference being had to the drawings and the designating characters thereon, the numeral 1 indicates the saddle, 2 the tugs or traces and 3 the breeching of a set of harness. The tugs 2, 2 are connected to opposite ends of the breeching 3, by buckles 4, thus dispensing with the hold back straps generally used, and the tugs are attached to the whiffle-tree 5, in front of the connection with the breeching, by means of clips on the ends of the swingle-tree, as shown in Fig. 1.

The whiffle-tree 5 is curved or semi-circular, is connected to the cross-bar 6 of the shafts in the usual manner and extends forward beyond the ends of the breeching, as shown in Figs. 1 and 2, thus putting the weight of the vehicle upon the whiffle-tree, instead of upon the shafts, in holding back the vehicle.

The clip is provided with side pins 7, by which the clip is secured to the whiffle-tree by bolts 8, 8, and on the inside of each clip is a lug 9 for supporting the tug, there being sufficient space between the side piece 7 and the lug 9 for the reception of the tug. The side pieces 7 are connected together by a plate or continuation 10, of the side pieces 7, and the lug 9 is a continuation of the inner side piece 7.

11 indicates a bolt passing transversely through the clip and is supported in the side pieces 7 and in the lug 9 in openings 12, 13 and 14 respectively, for the purpose of engaging the tug 2. On the bolt 11 is a coiled spring 15, one end of which engages the inside of one of the plates 7, and the opposite end engages a pin 16 in the bolt, for the purpose of automatically retracting or disengaging the bolt from the tug.

The bolt is pushed in by the person hitching the horse, and when the bolt has engaged the tug, a lever 17 pivotally secured to one of the side plates 7 at 18, is pushed over the end of the bolt and holds the bolt in position until released. The lever 17 is limited in its forward motion by a lug 19 on the end of the plate 7 to which the lever 17 is secured, and the end of the bolt is rounded to enable the lever 17 to pass readily over the bolt.

To each of the levers 17 is connected a cord 20, which extends rearward and is in ready reach or access of the driver and is pulled by him when it is desired to detach the horse from the vehicle.

It is obvious that changes in details of construction may be made without departing from the spirit of my invention.

Having thus fully described my invention, what I claim is—

1. The combination of a pair of tugs, a breeching connected thereto, a pair of shafts and a curved whiffle-tree on said shafts extending beyond the ends of the breeching and to which the tugs are detachably secured.

2. The combination of a pair of tugs, a breeching connected to the tugs, a pair of shafts, a curved whiffle-tree on said shafts extending beyond the ends of the breeching, means for securing the tugs to the whiffle-tree and means for disengaging the tugs therefrom.

3. The combination of a pair of tugs, a breeching connected to the tugs, a pair of shafts, a curved whiffle-tree on said shafts extending beyond the ends of the breeching, clips on the ends of the whiffle-tree, a bolt for engaging the tug, and means for disengaging the bolt from the tug.

4. The combination of a pair of tugs, a breeching connected to the tugs, a pair of shafts, a curved whiffle-tree on said shafts extending beyond the ends of the breeching, clips secured to the whiffle-tree and provided with a lug on the inside of the clip, a transverse bolt for engaging the tug, a spring for retracting the bolt, and a lever engaging the outer end of the bolt for holding it in engagement with the tug and for releasing the bolt and the tug.

In testimony whereof I affix my signature, in presence of two witnesses.

JAMES F. WILLIAMS.

Witnesses:
F. W. GRISELMANN,
F. O. DISHMAN.